J. H. REID.
PROCESS OF TREATING ORES AND METALS.
APPLICATION FILED SEPT. 9, 1908.

950,116.

Patented Feb. 22, 1910.

WITNESSES

INVENTOR
J. H. REID.
BY
HIS ATTYS.

UNITED STATES PATENT OFFICE.

JAMES HENRY REID, OF NEWARK, NEW JERSEY.

PROCESS OF TREATING ORES AND METALS.

950,116.

Specification of Letters Patent.  Patented Feb. 22, 1910.

Application filed September 9, 1908.  Serial No. 452,231.

*To all whom it may concern:*

Be it known that I, JAMES HENRY REID, of Newark, in the State of New Jersey, United States of America, have invented certain new and useful Improvements in Processes of Treating Ores and Metals, of which the following is a specification.

My invention relates to a refining and treating process, and the objects of my invention are to provide a simple and effective means of first reducing an ore and then treating the resultant metal, and the process is hereinafter described in detail in the accompanying specifications and drawings.

Figure 2:
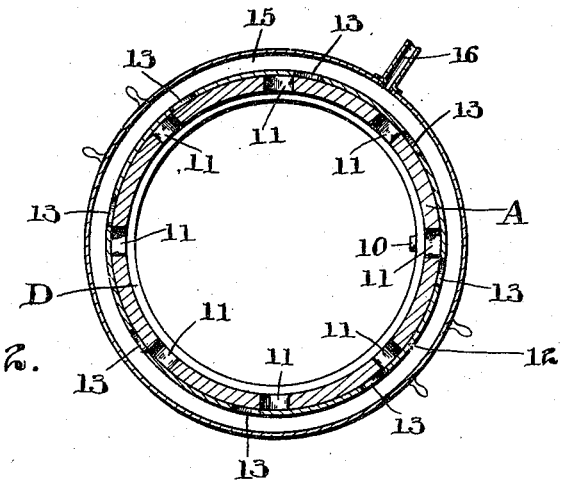
Figure 1:
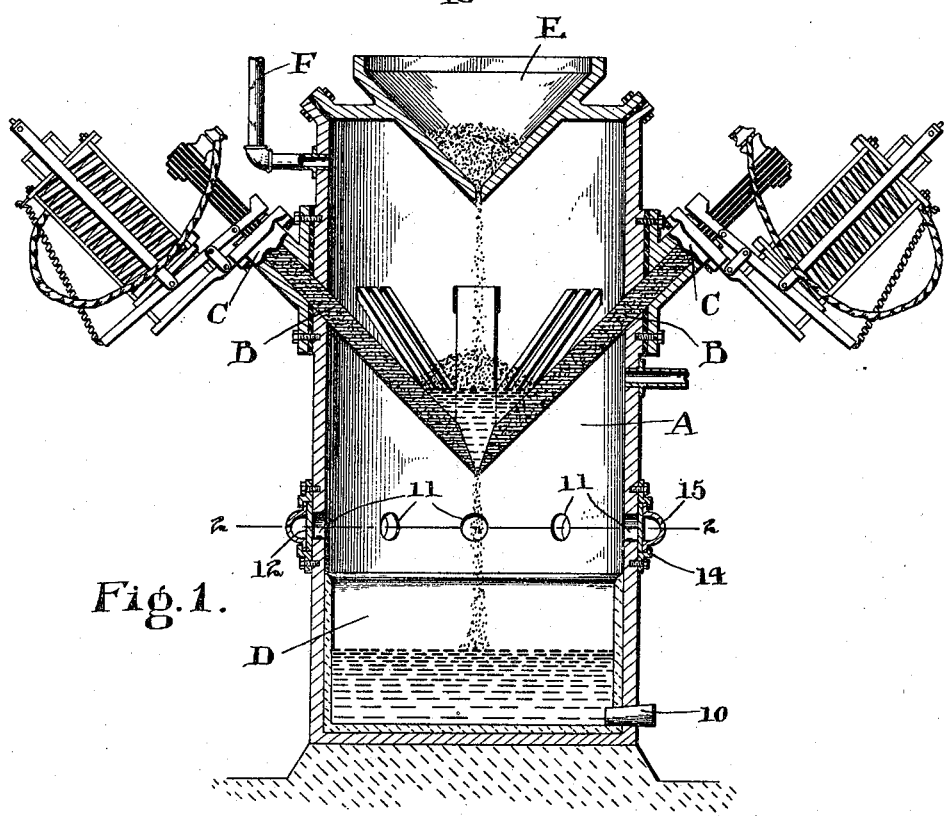

In the drawings:—Figure 1 is a vertical section through an electric furnace in which the process may be carried out. Fig. 2 is a vertical section along the line 2—2, Fig. 1.

According to the present process, the ore is first melted and reduced, preferably through the medium of the electric arc, the carbon of which effects a reduction. A gaseous reagent is then passed about the molten stream of the resultant metal to treat the same, the character of the treatment depending on the nature of the reagent. In the drawings, an embodiment of the apparatus for carrying out the process, is shown.

Referring to the drawings, A represents the body of the furnace, having electrodes B with regulators C, the said electrodes converging toward the center of the furnace and being adapted to constitute a crucible for the ore, during reduction, as more fully set forth and described in my earlier patent No. 910581 of Jan. 26th, 1909.

The bottom portion of the furnace in which the stream of molten metal from the arc discharges has preferably a lining D of refractory material, and is provided with a suitable discharge aperture 10. The ore is introduced into the furnace through a hopper E at the top thereof, and an exhaust pipe F is provided leading from the upper part of the furnace, to suitable exhausting, and if desired, condensing means.

To permit the carrying out of the present process, a plurality of apertures 11 are provided in the walls of the furnace below the electrodes, through which the gas may be admitted. The passage of gas through these openings is regulated by an annular plate 12, having corresponding apertures 13, which plate is rotatably supported from an annular flange 14 on the side of the furnace. In order to provide for the admission of different gases to the furnace, an annular conduit 15 is formed on the plate 12, which conduit is connected to a suitable supply pipe 16.

In carrying out the process the ore is introduced into the hopper 10 and falls in a continuous stream into the hopper formed by the converging electrodes. It is here melted by the electric arc and reduced by the carbon of the electrodes, the molten metal and slag dropping through to the bottom of the furnace.

The air or gas to be used in treating the metal is introduced through the apertures 10 and passed around the stream of metal and slag, the movement of the gas being effected by exhausting the upper part of the furnace through the pipe F. This suction, as well as moving the treating gas about the stream of ore exhausts the upper part of the pool of partly reduced ore on the electrodes. The effect of passing the gas will vary with the character of the ore and of the gas. For instance, an ore might first be reduced by the carbon of the electrode and then air might be drawn around the stream of metal to burn out the impurities. Otherwise, a reducing gas, such as carbon monoxid might be passed around the stream of metal to complete the reduction started in the arc. It will be observed that this suction, in addition to moving the stream of gas, also will operate to suck any carbon monoxid or dioxid gas in the metal out of the same.

In the refining of metal it is difficult, sometimes, to eliminate the carbon dioxide and monoxid from the molten metal and, I have found that the suction as used in the present case, will effectively withdraw the carbon and monoxid gas from the metal.

What I claim as my invention is:—

1. In the reducing of metals, the steps which consist in reducing ore and passing a gaseous reducing re-agent about a moving molten stream of resulting metal and at the same time exerting a sufficient suction on the stream to extract the carbon monoxid or dioxid gas from therein.

2. In the reducing and refining of metals, the steps which consist first in melting and reducing the ore, then passing a gaseous reagent about a moving stream of the resulting metal, and exerting a sufficient suction on the stream to extract any gas therefrom.

In witness whereof I have hereunto set my hand in the presence of two witnesses.

JAMES HENRY REID.

Witnesses:
RUSSELL D. SMART,
J. H. GLEN.